Oct. 28, 1969  J. A. WHITNEY ET AL  3,475,742
TEMPERATURE TELEMETERING SYSTEM
Filed Jan. 19, 1967  2 Sheets-Sheet 1

INVENTORS
John A. Whitney Jr.
Richard E. Woods
BY Hofgren, Wegner, Allen, Stellman & McCord
ATTORNEYS

United States Patent Office 3,475,742
Patented Oct. 28, 1969

3,475,742
TEMPERATURE TELEMETERING SYSTEM
John A. Whitney and Richard E. Woods, Fort Wayne, Ind., assignors to Peter Eckrich & Sons, Inc., a corporation of Indiana
Filed Jan. 19, 1967, Ser. No. 610,349
Int. Cl. G01k 5/18, 5/52, 5/72
U.S. Cl. 340—207
10 Claims

ABSTRACT OF THE DISCLOSURE

Disclosed herein is a temperature telemetering system including a transmitter adapted to be located within a temperature varying environment, and a remotely located receiver. The transmitter consists of a unijunction transistor oscillator with a silicon temperature sensing probe, for frequency modulating a carrier. The receiver demodulates the FM signal and triggers a monostable multivibrator, generating pulses which are integrated to produce a DC signal proportional to the frequency of the received signal, and hence proportional to the temperature sensed by the probe.

---

Figure 1:
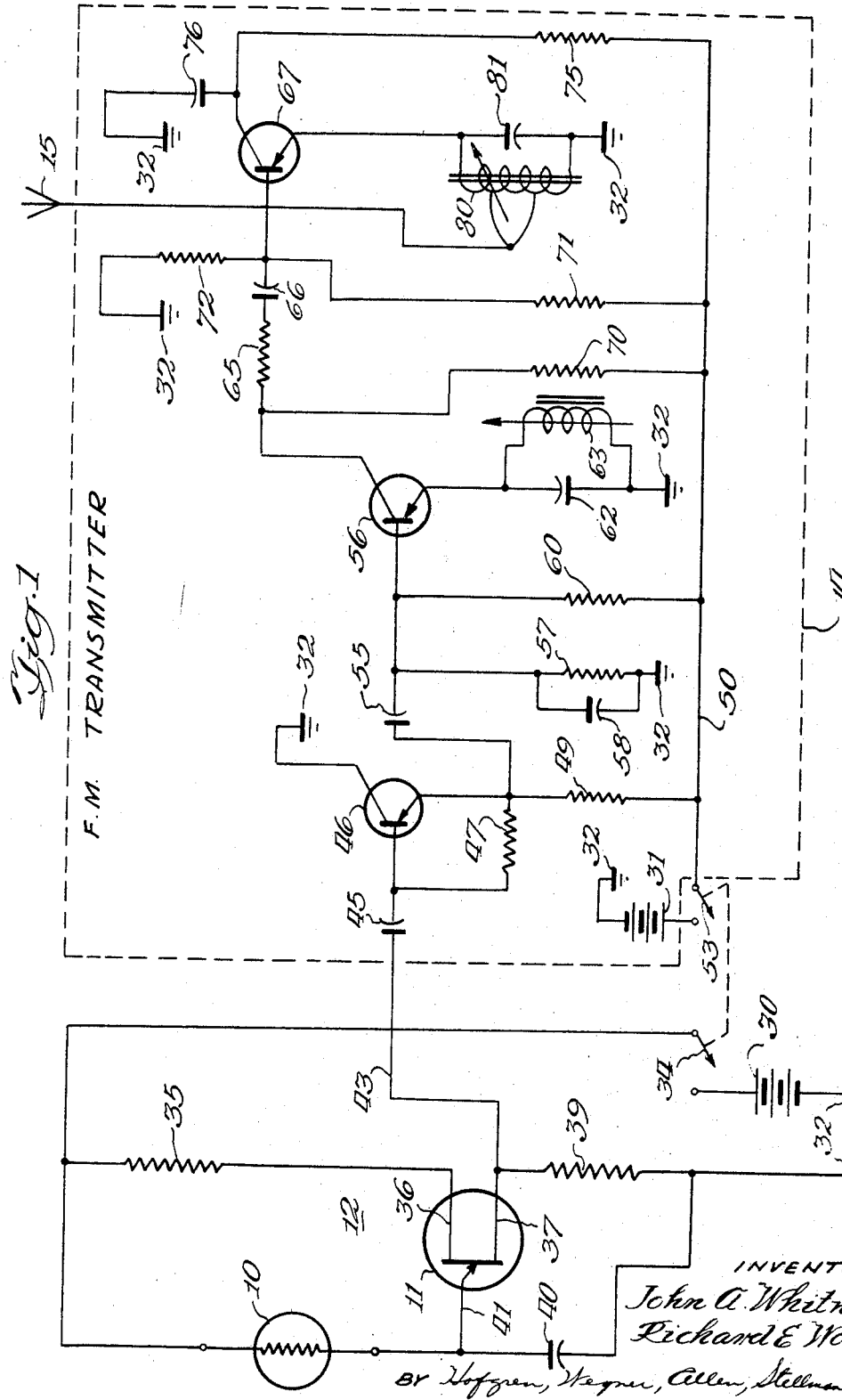

This invention relates to a temperature telemetering system, and more particularly to a system utilizing a temperature compensated transmitter and a receiver unaffected by varying strength signals.

Many known temperature telemetering systems convert temperature information into a signal which frequency modulates a carrier. The carrier signal is demodulated by a FM receiver at a location remote from the temperature to be monitored, in order to recover the original temperature information. Such known systems are adequate for applications where extreme accuracy and/or troublesome transmission paths are no problem.

An example of an application in which prior temperature telemetering systems have not been satisfactory is the continuous processing of meat products. The temperature within a meat product contained in a mold should be continuously monitored as the product is processed. For this purpose, a small transmitter is mounted adjacent the mold, having a temperature probe inserted within the product. Both the temperature probe and the transmitter travel with the product through high temperature ovens, creating temperature drift problems with the transmitter, and pass continually opening and closing doors, creating varying signal strength problems at the receiver due to multiple reflective signal paths. The effect of moisture and reflective bodies with capacitance also creates problems by shifting the frequency of the transmitted signal. Prior temperature telemetering systems have been unable to adequately correct for these problems, especially when linear operation is necessary, as 1% or better recording of the actual temperature within a meat product.

One object of the invention is the provision of an improved temperature telemetering system, including a transmitter and receiver of improved design.

Another object of the invention is the provision of a temperature telemetering transmitter which is adapted to operate within a temperature varying environment without adversely affecting the temperature information contained in the transmitted signal.

Still another object of the invention is the provision of a temperature telemetering receiver which recovers temperature information from a signal which has been subjected to an adverse transmission path.

One feature of this invention is the provision of a temperature compensated transmitter including a unijunction transistor oscillator having a frequency output linearly dependent on the temperature across a single element thereof, even though the other elements comprising the oscillator are subject to a temperature varying environment.

Another feature of this invention is the provision of a unijunction transistor oscillator having a positive temperature coefficient transducer which compensates for the effect of temperature on the unijunction transistor.

Yet another feature of this invention is the provision of a receiver insensitive to varying strength input signals. The input signals trigger a monostable multivibrator, generating repeatable pulses which are integrated to produce an output signal representative of the repetition rate of the input signal.

Figure 2:
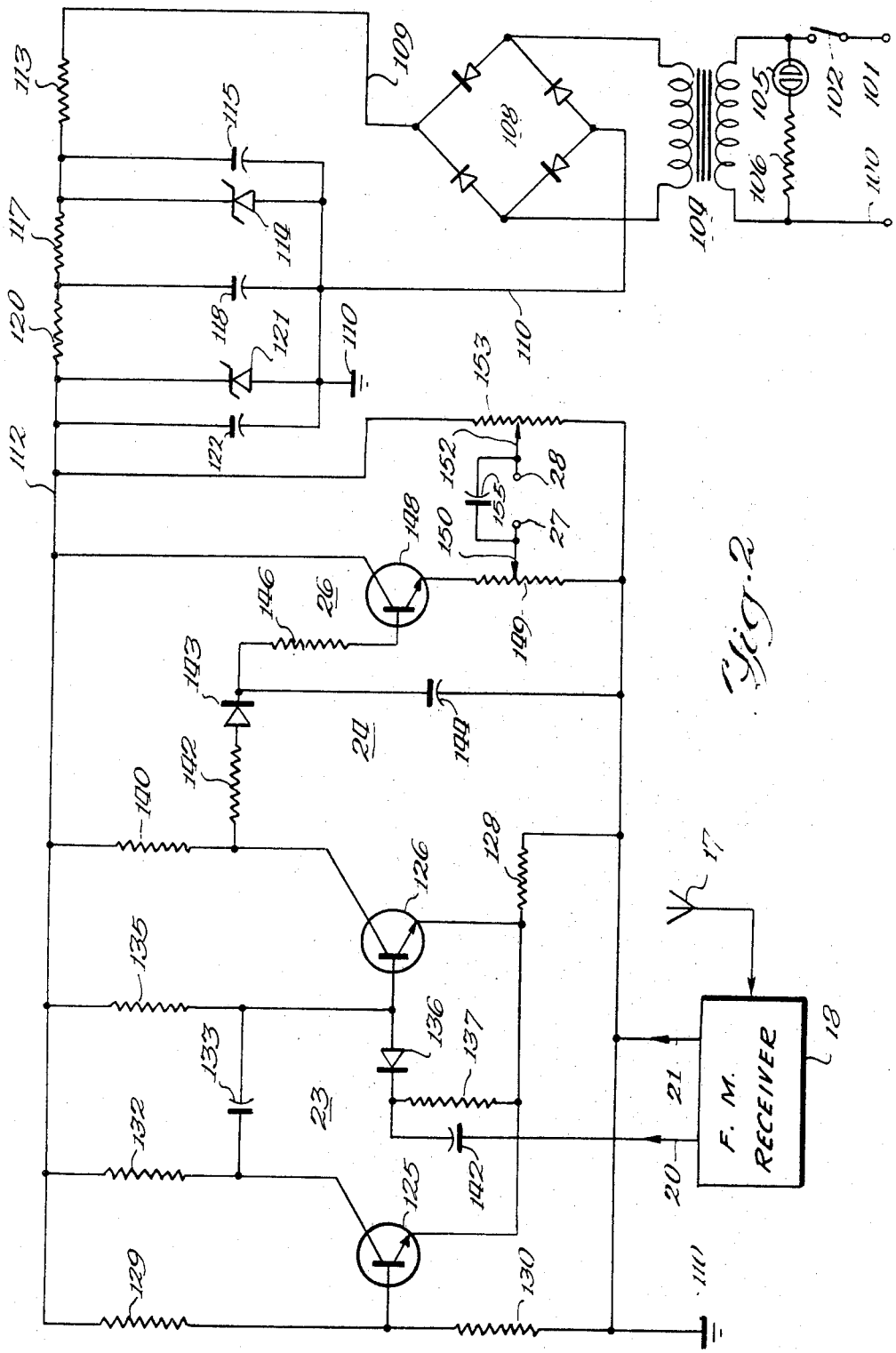

Further features and advantages of the inveniton will be apparent from the following description and from the drawings, in which:

FIGURE 1 is a schematic diagram of the temperature telemetering transmitter; and FIGURE 2 is a schematic diagram of the temperature telemetering receiver.

While illustrative embodiments of the invention are shown in the drawings and will be described in detail herein, the invention is susceptible of embodiment in several different forms, and it should be understood that the present disclosure is to be considered as an exemplification of the principles of the invention and is not intended to limit the invention to the embodiments illustrated. Throughout the specification, values and type designations will be given for the components in order to disclose a complete, operative embodiment of the invention. However, such values and type designations are not critical unless specifically so stated. The scope of the invention will be pointed out in the appended claims.

In FIGURE 1, an FM transmitter compensated for a temperature varying environment is illustrated. A temperature sensor 10 is mounted in heat transfer relationship with the temperature to be monitored, as by being located on the end of a probe which is inserted into the interior of meat product held within a mold. Sensor 10 controls the period of oscillation of a unijunction transistor (UJT) 11, connected as a relaxation oscillator 12. Cyclically recurring, generally narrow pulse shaped waveforms from oscillator 12 are coupled to an FM transmitter 14, per se of conventional design, which is modified to be insensitive to temperature variations. The narrow pulse waveforms frequency modulate a carrier, and the resulting FM signal is coupled to an antenna 15 for radiation into space.

The signal radiated from the transmitter is picked up by the receiver illustrated in FIG. 2, positioned at a location remote from the temperature being monitored. An antenna 17 couples the received FM signal to an FM receiver 18, per se of conventional design, tuned to the carrier frequency of the transmitter of FIGURE 1. Receiver 18 recovers the generally narrow pulse waveform which was originally generated by oscillator 12 in FIGURE 1. This audio output signal from receiver 18 is available across a pair of output lines 20, 21 which connect with the applicants' decoder for converting the signal into temperature information.

The decoder consists of a monostable multivibrator 23 which is triggered by the narrow pulse signal to generate an output pulse of predetermined pulse width for each cycle of the narrow pulse waveform. The pulse output from multivibrator 23 is coupled to an integrator 24 for summing the pulses to produce a DC signal directly proportional to the period, i.e., the repetition rate, of the narrow pulse input waveform. This DC signal is passed through an isolator 26 and coupled to a pair of output terminals 27, 28.

The DC signal available across terminals 27, 28 is directly and linearly proportional to the number of narrow pulse oscillations per unit time which modulated the FM signal received by antenna 17. Since the number of oscillations per unit time is directly linearly proportional to the temperature at sensor 10, the output signal across terminals 27, 28 accurately indicates the temperature being monitored. Because the recovered narrow pulse waveform is not directly integrated, but rather only triggers monostable multivibrator 23, the decoder is insensitive to varying strength signals and spurious noise.

The combination of the illustrated transmitter and receiver allows a temperature to be monitored and recorded over a wide temperature range, as for example 0° C. to 100° C., with a better than 1 percent linearity between the actual and recorded temperatures.

Turning in detail to FIGURE 1, power for relaxation oscillator 12 and FM transmitter 14 are obtained from a pair of 8.4 volt DC batteries 30 and 31, respectively. The negative side of each battery is connected to a source of ground or reference potential 32. The positive side of battery 30 is connected through a switch 34 to the junction of sensor 10 and a 270 ohm thin film resistor 35. Resistor 35 is connected to the B2 electrode 36 of UJT 11. A B1 electrode 37 of UJT 11 is connected through a 61.9 ohm thin film resistor 39 to ground 32.

Sensor 10 and a 0.47 microfarad Mylar capacitor 40 form a series charging path across battery 30 when switch 34 is closed. The junction of sensor 10 and capacitor 40 is connected to an emitter electrode 41 of UJT 11. In operation, emitter 41 is reversed biased when switch 34 is first closed, causing UJT 11 to be nonconductive. As capacitor 40 charges through sensor 10, the emitter voltage rises exponentially toward the supply voltage of battery 30. When the emitter voltage reaches the peak point voltage of the unijunction transistor, the now forward biased UJT 11 becomes conductive, causing capacitor 40 to discharge through emitter 41 and B1 electrode 37. Thereafter, the capacitor again charges and the cycle is repeated. The output voltage across resistor 39 is a generally narrow pulse waveform which is coupled to transmitter 14 for modulating the carrier to produce an FM signal.

Temperature sensor 10 increases in resistance for increases in temperature. As the temperature changes, the time constant of the series RC circuit 10, 40 changes, thereby changing the time of firing of UJT 11. This in turn changes the repetition rate of the narrow pulse waveform across resistor 39, and hence essentially changes the frequency of oscillations from relaxation oscillator 12. As temperature increases, capacitor 40 charges at a slower rate, causing the frequency of the narrow pulse oscillations to decrease.

While only sensor 10 is located within the meat product itself, the remaining portions of the oscillator 12 and transmitter 14 are located in generally the same temperature varying environment as sensed by sensor 10. Oscillator 12 must be temperature compensated to produce an output signal whose frequency is linearly proportional to only the temperature across sensor 10. For this purpose, sensor 10 is preferably a solid state temperature sensing resistor having a positive temperature coefficient of resistance, such as 0.7° C. Such a sensor may be formed from a silicon rather than a metal junction. UJT 11 has an approximately 2.6 millivolt drop per degree centigrade across its emitter 41 and B1 electrodes 37. The use of a positive temperature coefficient sensor 10 compensates for this voltage drop. One suitable sensor is a Texas Instruments "Sensistor," type TM 1/8, having a 3.9 kilohm resistance at 25° C.

In addition to the compensation of silicon sensor 10, the relaxation oscillator 12 is compensated for temperature by known techniques including the proper choice of the resistance value of resistors 35 and 39, and by the use of a Mylar capacitor 40. The combination of the above temperature compensation produces a narrow pulse output having a repetition rate which is essentially linearly related to the temperature of sensor 10 alone.

The narrow pulse signal on B1 electrode 37 is coupled by a line 43 to transmitter 14 which is of generally known configuration. The transmitter illustrated in the dashed lines is a commercial Kinematix type IMP II FM transmitter with additional temperature compensation. The exact details of the transmitter for frequency modulating a carrier form no part of the instant invention, and therefore will be briefly described since the general theory of operation is well known.

Line 43 is coupled through a 0.1 microfarad capacitor 45 to a 2N508 transistor 46. A 100 kilohm resistor 47 shunts the base emitter of transistor 46. In addition, the emitter is coupled through a 100 ohm resistor 49 to a line 50 which is coupled through a switch 53 to the positive side of battery 31. Switches 34 and 53 may be ganged together to connect power to both the relaxation oscillator 12 and transmitter 14 at the same time.

The junction of resistors 47 and 49 is coupled through a 4.0 microfarad capacitor 55 to the base of a transistor 56, type 2N267. An RC network, composed of a 10 kilohm resistor 57 and a 0.001 microfarad capacitor 58 is coupled between the base of transistor 56 and ground 32. A 4.7 kilohm resistor 60 connects the base of transistor 56 with line 50.

The emitter of transistor 56 is connected through a resonant tank, composed of a capacitor 62 and an inductor 63 having a ferrite core, to ground 32. The collector of the transistor is coupled through a 56 ohm resistor 65 and a 50 picofarad capacitor 66 to the base of an output transistor 67, type 2N267. A 1000 ohm resistor 70 connects the collector of resistor 56 to positive potential 50. A voltage divider consisting of a 4.7 kilohm resistor 71 and a 1 kilohm resistor 72 is coupled between positive potential line 50 and ground 32, with the junction of the resistors being directly connected to the base of transistor 67. The collector of transistor 67 is coupled through a 10 kilohm resistor 75 to positive line 50, and is shunted to ground 32 through a 0.001 microfarad capacitor 76. The emitter of the transistor is coupled through another resonant tank which is tuned to the carrier frequency, consisting of a variable inductor 80 in parallel with a capacitor 81. A pair of taps on inductor 80 directly connect to antenna 15.

Transmitter 14 frequency modulates the carrier signal, determined by tank circuits 80, 81, with the recurring narrow pulse waveform on line 43. The resulting FM output signal has a carrier frequency from 88–108 megacycles, of low amplitude for short range transmission. The oscillator 12 and transmitter 14 consume little power, allowing use of batteries, and the relaxation oscillator 12 using UJT 11 is relatively insensitive to small battery changes that occur in time.

The transmitted low amplitude signal is received by the antenna 17 of the receiver and decoder illustrated in FIG. 2. The decoder circuit is powered from a conventional 115 volt AC source (not illustrated) which may be connected to lines 100, 101. Line 101 is connected through a switch 102 to a stepdown transformer 104 having approximately a 36 volt output. A series connected neon bulb 105 and 180 kilohm resistor 106 can be connected across the primary side of the transformer 104 to indicate when switch 102 is closed. The AC voltage from the secondary of transformer 104 is rectified by a full-wave diode bridge 108 having a positive pulsating DC voltage available on a line 109 and a negative or ground reference potential on a line 110.

The positive pulsating DC voltage on line 109 is clipped and smoothed by a two stage Zener diode circuit to provide on an output line 112 a constant DC voltage with little ripple. For this purpose, line 109 is coupled through a 270 ohm resistor 113 to a 27 volt Zener diode 114 in parallel with a 20 microfarad electrolytic capacitor 115. The clipped voltage across Zener 114 passes through a 37 ohm resistor 117 and a 40 microfarad electrolytic capacitor 118 shunted to ground 110. In order to produce a more constant voltage than that available across capacitor 118, a second Zener diode stage consists of a 1000 ohm resistor 120 coupled between resistor 117 and line 112, and a paralleled 22.5 volt Zener diode 121 and an 80 microfarad electrolytic capacitor 122 shunted to ground 110. The resulting DC voltage on line 112 is used to power the decoder portion of the receiver. FM receiver 18 may contain a conventional power supply for the circuits contained therein.

Monostable multivibrator 23 is formed from a pair of NPN type 2N3053 transistors 125 and 126. The emitters of both transistors are connected through a common 1.5 kilohm resistor 128 to ground 110. Transistor 125 is biased through a voltage divider consisting of a series connected 270 kilohm resistor 129 and a 27 kilohm resistor 130 connected between line 112 and ground 110. The junction of resistors 129 and 130 is directly connected to the base of transistor 125. The collector of transistor 125 is coupled through a 22 kilohm resistor 132 to line 112, and through a 0.00303 microfarad capacitor 133 to the base of transistor 126.

The transistor 126 is connected to a voltage divider network consisting of a series connected 270 kilohm resistor 135, a diode 136, and a 10 kilohm resistor 137 connected between positive line 112 and through the common emitter resistor 128 to ground 110. The collector of transistor 126 is coupled through a 10 kilohm resistor 140 to positive line 112.

In operation, transistor 126 is driven into its saturated conducting state when switch 102 is first turned on, thereby driving transistor 125 into its nonconducting state. The circuit is stable until a negative pulse is connected to the junction of diode 136 and resistor 137. At that time, transistor 126 will be driven nonconductive, causing transistor 125 to switch to its conducting state. At the same time, the voltage at the collector of transistor 126 rises toward the value on line 112. After a fixed time period lapses, determined by the time constant of the circuit, the monostable multivibrator automatically switches back to its original state, causing the voltage at the collector of transistor 126 to drop back to the value at the high voltage side of emitter resistor 128. The pulse signal at the collector of transistor 126 will therefore be of predetermined width, regardless of the width of the negative trigger pulse as long as the trigger pulse has disappeared sufficiently prior in time to allow the monostable multivibrator to return to its initial state.

A 0.000031 microfarad capacitor 142 connects the junction of diode 136 and resistor 137 with output line 20 of FM receiver 18. Output line 21 of the FM receiver is directly connected to ground 110. The generally narrow pulse output waveform on lines 20, 21 should be negative going. As the narrow width pulse increases absolutely in value, i.e., goes more negative, monostable multivibrator 23 is triggered into its unstable state. Diode 136 isolates the multivibrator once it is triggered.

The width or duration of the output pulse of multivibrator 23 is determined purely by the time constant of the circuit, which is dependent upon the values of the resistive and capacitive components forming the monostable multivibrator; and is not affected by the amplitude nor width of the incoming trigger signal. The time constant is chosen to have a value which causes the output pulse to occupy 70 to 80 percent of the total period of the highest input frequency of the narrow pulse trigger signal, such as 300 c.p.s. With such a time constant, one output pulse of constant pulse width is generated for each cycle of the output wave from FM receiver 18. Furthermore, the output pulse is of constant amplitude and duration even though the signal from receiver 18 is varying in amplitude due to a poor transmission path between the transmitter and receiver antennas.

The output pulse at the collector of transistor 126 is coupled through a 68 kilohm resistor 142 and a diode 143 to a 0.1 microfarad capacitor 144. Resistor 142, diode 143, and capacitor 144 cause the pulses from monostable multivibrator 23 to be rectified and integrated, producing a DC voltage across capacitor 144 which is directly linearly proportional to the frequency of the triggering signal on lines 20, 21.

The DC voltage across capacitor 144 is coupled to output terminals 27, 28 through an isolating device 26 in the form of an emitter-follower circuit. For this purpose, a 10 kilohm resistor 146 is coupled from the junction of diode 143 and capacitor 144 to the base of a NPN type 2N2035 transistor 148. The collector of transistor 148 is directly connected to positive line 112, while the emitter is coupled through a 10 kilohm potentiometer 149 to ground 110. A variable tap 150 on potentiometer 149 is directly connected to output terminal 27. The output terminal 28 is directly connected to a tap 152 on a 10 kilohm potentiometer 153 connected between positive line 112 and ground 110. Terminals 27, 28 are shunted by a 100 microfarad capacitor 155.

In operation, transistor 148 operates as an emitter-follower, isolating capacitor 144 from any recording instrument which may be connected to output terminal 27, 28. For the component values given, a 0 to 100 millivolt potential across terminals 27, 28 will linearly correspond with a 0° to 88° C. temperature variation at temperature sensor 10 in FIGURE 1. The linearity may be held to within one-fifth of 1 percent across the whole range of monitored temperatures.

Variable tap 150 may be adjusted to change the range or span of voltages which are to be monitored, hence changing the range of temperatures which are recorded. Variable tap 152 may be adjusted to add a bucking voltage across the output terminals in order to set a meter or recording instrument to a zero reading. In this manner, a plurality of ranges of temperatures, each of which may be read from zero to full meter setting, are available at the receiver.

We claim:
1. A temperature telemetering system, comprising in combination:
   a transmitter located within a temperature varying environment which includes a temperature to be monitored, including a temperature sensor having a resistance proportional to temperature, said sensor being located in heat transfer relation with the temperature to be monitored, semiconductor means connected with said sensor for modulating a carrier with a recurring waveform having a period dependent upon the monitored temperature, a change in resistance of said sensor changing the period of said waveform; and
   a receiver located at a position remote from said temperature varying environment, including means for demodulating said carrier to recover said recurring waveform, means responsive to each recurrence of a portion of the demodulated waveform for generating a pulse of predetermined constant width, means for integrating the pulses from said generating means to produce a signal having an amplitude proportional to the number of pulses occurring per unit of time, whereby said signal is directly proportional to the temperature to be monitored.

2. The system of claim 1 wherein said transmitter includes means connecting said sensor in a voltage charging path, said semiconductor means including a device having a semiconductor junction controlling the conductive state of said device, means connecting said junction to said charging path and responsive to a predetermined voltage for switching said device into a conductive state to discharge the voltage in said charging path and generate said recurring waveform, said sensor formed from semiconductor material and having a resistance with a positive temperature coefficient, thereby temperature compensating said junction.

3. The system of claim 2 wherein said device comprises a unijunction transistor having first and second base electrodes and an emitter electrode, the emitter electrode and one of said base electrodes forming said semiconductor junction for controlling the conduction state of the unijunction transistor, a source of DC voltage, a capacitor, said voltage charging path includes said sensor and said capacitor connecting in series across said DC source, said junction connecting means coupling said emitter electrode to a point between said series connected sensor and capacitor and responsive to a predetermined voltage across said capacitor for switching said unijunction transistor into a conductive state, said sensor resistance and said semiconductor junction in combination having a substantially linear resistance over the range of temperatures in said temperature varying environment.

4. The system of claim 3 wherein the semi-conductor material of said sensor is silicon, said capacitor being formed from material including Mylar, said sensor and capacitor material compensating for the change in voltage drop across said junction over said range of temperatures.

5. The system of claim 1 wherein said pulse generating means comprises a monostable multivibrator for generating said pulse with a predetermined width less than the period of the highest frequency of the recurring waveform, and isolating means connected to the output of said integrating means for preventing a load from affecting the amplitude of said voltage.

6. A temperature telemetering system, comprising in combination:
a transmitter located within a temperature varying environment which includes the temperature to be monitored, including a temperature sensor having a resistance proportional to temperature, said sensor being located in heat transfer relation with the temperature to be monitored, semiconductor means connected with said sensor for modulating a carrier with a cyclically recurring signal having a period proportional to the temperature to be monitored, a change in resistance of said sensor changing the period of said signal;
a receiver located at a position remote from said temperature varying environment, including monostable multivibrator means responsive to the occurrence of a certain portion of said cyclically recurring signal for generating a pulse of predetermined constant width, the width of said pulse being less than the period of the highest frequency of the cyclically recurring waveform; and integrating means connected to said monostable multivibrator for integrating said pulses to develop an electrical signal having an amplitude proportional to the frequency of the recurring signal, whereby said signal is directly proportional to said condition.

7. The system of claim 6 wherein said integrating means includes a series connected resistor and capacitor, and means connected across said capacitor for isolating said electrical signal.

8. The system of claim 7 wherein said isolating means includes a transistor having base, collector, and emitter electrodes, a resistor connected to said emitter electrode, and means connecting said base and collector electrodes and said resistor in an emitter follower circuit, the input of said emitter follower circuit being connected across said capacitor, and the output of said emitter follower circuit being available across said resistor.

9. The system of claim 8 wherein said resistor connected to said emitter electrode is variable, whereby adjustment of said resistor modifies the range of conditions of said cyclically recurring signal which is recovered by the receiver.

10. The system of claim 9 including means for adding a bucking voltage of predetermined value to the voltage from the variable resistor in said emitter follower circuit, adjustment of said bucking voltage setting said electrical signal to zero.

References Cited

UNITED STATES PATENTS

| | | | |
|---|---|---|---|
| 2,411,130 | 11/1946 | Evans | 340—206 |
| 2,418,268 | 4/1947 | Lawson | 332—14 |
| 2,468,703 | 4/1949 | Hammel. | |
| 3,158,027 | 11/1964 | Kibler. | |
| 3,162,857 | 12/1964 | Sanders | 325—143 XR |
| 3,183,705 | 5/1965 | Welkowitz. | |
| 3,186,229 | 6/1965 | Liben | 73—362 |
| 3,287,975 | 11/1966 | Mason et al. | 73—362 XR |
| 3,308,667 | 3/1967 | Pearlman | 73—362 |
| 3,333,476 | 8/1967 | Hardy et al. | 73—362 |

THOMAS B. HABECKER, Primary Examiner

CHARLES M. MARMELSTEIN, Assistant Examiner

U.S. Cl. X.R.

73—339, 362; 340—177, 206; 331—111